United States Patent [19]

Freeman et al.

[11] Patent Number: 4,852,466
[45] Date of Patent: Aug. 1, 1989

[54] FLOATING DIAPHRAGM APPARATUS

[75] Inventors: Mark D. Freeman, Wrentham; John L. Koukol, Jr., North Attleboro; Stanislaw Koziol, Wrentham; George E. Sgourakes, Millis, all of Mass.

[73] Assignee: The Foxboro Company, Foxboro, Mass.

[21] Appl. No.: 50,167

[22] Filed: May 15, 1987

[51] Int. Cl.⁴ .............. F01B 19/00; F16J 3/00; G01L 7/00; G01L 7/08
[52] U.S. Cl. ........................ 92/104; 92/96; 73/756; 73/715
[58] Field of Search ............ 92/34, 47, 101, 102, 92/96, 103 M, 104, 97, 49, 48; 73/756, 715, 729, 723, 724, 725, 726, 727, 728

[56] References Cited

U.S. PATENT DOCUMENTS

| 3,202,063 | 8/1965 | Bissell et al. | 92/91 |
| 3,390,579 | 7/1968 | Giattenberg et al. | 73/729 |
| 3,602,048 | 8/1971 | Murata | 73/715 |
| 3,645,139 | 6/1970 | Zavoda | 73/715 |
| 3,808,890 | 5/1974 | Neugebauer | 73/715 |
| 4,333,350 | 6/1982 | Gibb | 73/715 |
| 4,380,041 | 4/1983 | Ho | 361/283 |

FOREIGN PATENT DOCUMENTS

| 861732 | 1/1953 | Fed. Rep. of Germany | 92/34 |
| 3121799 | 12/1982 | Fed. Rep. of Germany | |
| 0235731 | 5/1986 | Fed. Rep. of Germany | 73/715 |
| 864207 | 11/1939 | France | 73/715 |
| 591134 | 4/1959 | Italy | 73/715 |
| 119279 | 9/1979 | Japan | 73/715 |
| 160035 | 10/1982 | Japan | 73/715 |
| 0082827 | 5/1985 | Japan | |
| 82/01609 | 4/1984 | PCT Int'l Appl. | 92/34 |
| 463021 | 5/1975 | U.S.S.R. | 73/715 |
| 708192 | 1/1980 | U.S.S.R. | 73/715 |
| 1298554 | 3/1987 | U.S.S.R. | 73/715 |
| 1315835 | 6/1987 | U.S.S.R. | 73/715 |
| 1437443 | 5/1976 | United Kingdom | 73/715 |
| 2086058 | 5/1982 | United Kingdom | |

Primary Examiner—Robert E. Garrett
Assistant Examiner—Thomas Denion
Attorney, Agent, or Firm—Jules Jay Morris

[57] ABSTRACT

Floating the diaphragm portion of a diaphragm sensor in the pressurizing fluid frees the diaphragm from exterior housing forces, and makes overall manufacture and replacement inexpensive. A diaphragm can be protected from exterior stress by interspersing a channel between the diaphragm edge and the closure and support structure of an enclosing housing. By extending the channel and incorporating an adequate seal, the diaphragm structure may be made replaceable. The replaceable diaphragm further allows use of a smaller amount of costly materials, and makes repair less costly.

21 Claims, 2 Drawing Sheets

FLOATING DIAPHRAGM APPARATUS

TECHNICAL FIELD

The present device relates to pressure measuring devices, and in more particular to pressure measuring devices employing a diaphragm for fluid pressure measurement.

BACKGROUND OF THE INVENTION

Diaphragms are used to transmit a fluid pressure from one area of a sensor to another. It may be that the process area of a sensor is corrosive or otherwise has a detrimental effect on the sensing elements, or that the sensed pressure needs to be scaled for measurement.

Diaphragm assemblies are commonly made by machining a cavity in a block leaving formed convolutions on the cavity wall opposite the entrance. A diaphragm comprising a thin flexible metal sheet with convolutions corresponding to the convolutions of the cavity is welded to the block material around the cavity entrance. On pressurization, the diaphragm is pressed into the cavity, thereby transmitting the exterior pressure to the interior of the cavity. The diaphragm convolutions expand some, giving the diaphragm greater flexible range. If the diaphragm is pressurized further, the diaphragm is pressed against the cavity wall, mating the corresponding convolutions which then resist further extension of the diaphragm. Without the cavity wall as a stop, the diaphragm my be warped, stretched or otherwise permanently altered by over pressurization, thereby changing the response characteristics of the device.

Problems arise in preserving the accuracy of a diaphragm in actual service. Typically, the cavity block is bolted in place with a process gasket compressed against the sealing surface of the cavity block. The different bolts may be tightened to different forces, or the elements bolted to may shift. Similarly, the forces across the cavity block, may change with temperature, static pressure, bolt relaxation or other factors. A force across the cavity block results which may in turn be transferred to the diaphragm. The diaphragm may, like a drum, then be tightened, twisted, or relaxed with respect to its original condition. The result is an altered response.

Manufacturing a traditional diaphragm device is costly. In particular, machining the convolutions in the cavity block is costly. If the diaphragm is miswelded, leaks, fails or is otherwise defective, the cavity block, with its costly convolutions, ports and other features is sacrificed, along with the defective diaphragm.

Process environments can be highly corrosive, and chemical interaction between diaphragm material and process fluid can degrade diaphragm performance or may cause diaphragm failure. A process diaphragm wetted by the process fluid must then withstand the extreme chemical conditions. Unfortunately, no known inexpensive material resistant to all process fluids is available. As a result, a variety of somewhat exotic and generally expensive materials are used in manufacturing diaphragms. Joining the diaphragm securely to housing is difficult when the housing material is not the same as the diaphragm material. As a result, the expensive material chosen for the small or thin diaphragm is repeated in the heavy housing structures. The housings as a result are needlessly expensive.

It is then an objective of the present invention to provide a pressure responsive diaphragm device. It is a further objective to provide a diaphragm device minimally affected by mounting, temperature or other forces placed on the housing of an incorporating device. It is still a further objective to provide a diaphragm device separable, at least during manufacture, from an incorporating device. It is still a further objective to provide a diaphragm device allowing housing structures made of ordinary materials.

SUMMARY OF THE INVENTION

A diaphragm device may be substantially floated in a fluid, thereby isolating the diaphragm from exterior stresses placed on the incorporating device. In one form, a diaphragm unit is formed across a rigid backup plate to form a unit enclosing an interior diaphragm cavity. At least the attachment edge of the diaphragm is then freed from most direct or indirect exterior forces. The diaphragm cavity is joined through the backup plate to a tube passing through a housing port. The volume separating the backup plate from the housing is filled with the same fluid pressurizing the diaphragm. In a second form, two flexible diaphragms are joined with a rigid circumferential support. One of the diaphragms includes support for a tube ported to a housing. In both forms, only the tube connecting the housing to the diaphragm unit is available to conduct undesireable structural forces to the diaphragm. The pathways for exterior forces to reach the diaphragm are then significantly reduced.

BEST MODE FOR CARRYING OUT THE INVENTION

Figure 1:
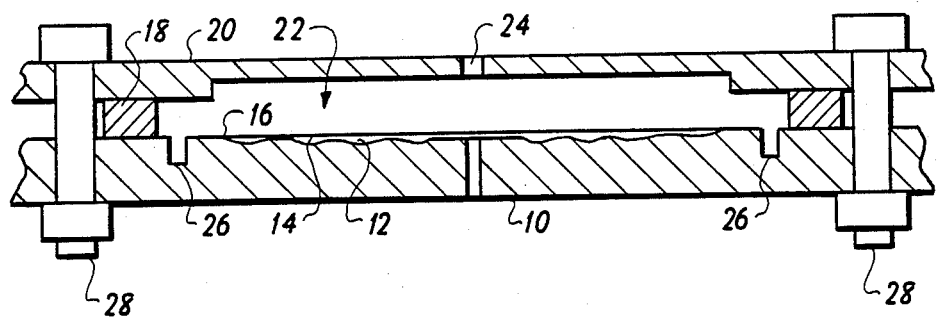
FIG. 1 shows a cross section of a partially isolated diaphragm in a partially broken away housing.

FIG. 1 shows a partially isolated diaphragm. A housing 10 is shown with an included diaphragm cavity 12. Across the diaphragm cavity 12, a generally planar diaphragm 14 is extended and sealed to the housing 10 along an attachment edge 16. Adjacent the housing 10 and encompassing the sealed diaphragm 14 is a process gasket 18. The diaphragm 14, and the process gasket 18, are covered by a cover plate 20 to enclose a housing cavity 22. The cover plate 20 includes a process fluid port 24 to conduct process fluid to the housing cavity 22. Formed in the housing 10, encircling the diaphragm 14, and transverse to the plane of the diaphragm 14, is an isolation channel 26. The isolation channel 26 partially isolates the diaphragm 14 by being intermediate the attachment edge 16 and bolts 28 joining the housing 10 to the cover plate 20. In particular, the planar attachment edge 16 of the diaphragm 14 is isolated from the force bearing mechanisms joining the housing 10 to the cover plate 20.

Isolation reduces the effect of exterior forces and other structural forces on the housing 10 may have on the diaphragm 14. In particular, forces parallel to the surface of the housing 10 in the plane of the attachment edge 16 are forced to follow paths away from the attachment edge 16. As the extent of the isolation increases, the effect of the exterior forces is progressively reduced. No least amount of isolation has been identified, but placing a channel 26 between the force bearing portions of the housing 10 and the diaphragm's 14 attachment edge 16 is felt likely to have a measurable effect. A channel 26 whose depth is in the range of one half the diaphragm's 14 radius, is thought likely to isolate adequately the diaphragm's 14 attachment edge 16 from the exterior and structural forces experienced by the housing 10. Similarly, undercutting from the channel 26 beneath the diaphragm 14 further isolates the diaphragm 14. Structural forces transmitted from any point along the housing's 10 surface become cut off from and fail to affect the attachment edge 16. As the channel 26 becomes deeper, and undercuts the diaphragm 14 farther, isolation becomes progressively more complete. In the extreme, the pressurized fluid in the diaphragm cavity 12 needs to communicate through a passage, for example a tube, out to a sensing device. The tube needs sufficient strength to withstand the pressure and mechanical forces placed on it and should not be so narrow or lengthy as to constrict flow to and from the diaphragm cavity 12. The tube then becomes the only avenue for transmitting exterior or structural forces to the diaphragm, and should therefore be made small.

Figure 2:
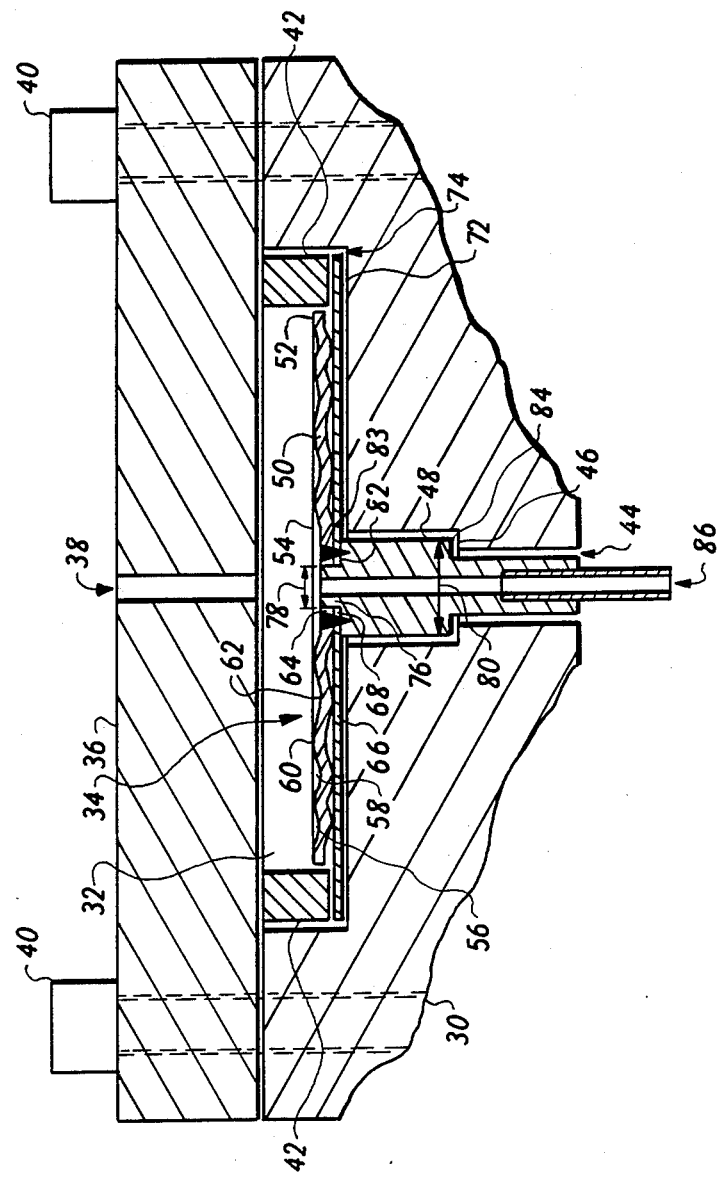
FIG. 2 shows a cross section of the preferred embodiment of a floating process diaphragm in a partially broken away housing.

FIG. 2 shows a cross section of the preferred embodiment of a floating process diaphragm in a partially broken away housing. A housing 30 is formed with an included housing cavity 32 to contain a diaphragm unit 34. A cover plate 36 including a process fluid port 38 is placed across the housing 30 to enclose the housing cavity 32. The housing 30, and cover plate 36, are joined by bolts 40 compressing a process gasket 42 to seal the housing cavity 32. The housing 30 includes a housing port 44 and housing seat 46 to receive a tube 48 portion of the diaphragm unit 34.

The floating diaphragm unit 34 comprises a rigid backup plate 50 to which, along an attachment edge 52, a diaphragm 54 is mounted. The diaphragm 54 is mounted across a concave portion 56 of the backup plate 50 forming between the backup plate 50, and the diaphragm 54 a diaphragm cavity 58. The diaphragm 54 is fluid impermeable but still thin enough to be flexible with pressure variations between the housing cavity 32 and diaphragm cavity 58. The preferred diaphragm 54 includes convolution (not shown) as known in the art. The backup plate 50 need not be absolutely rigid, only sufficiently more rigid than the diaphragm 54 so diaphragm 54 deflection is the predominate motion on pressure variation.

Opposite the diaphragm 54, on the concave portion's 56, interior surface 60 there are convolutions 62 matable to the diaphragm convolutions. Should the diaphragm 54 be over pressurized, the diaphragm 54 is forced only to the backup plate 50 where the diaphragm 54 is stopped from further extension. The preferred form of manfacturing the backup plate 50 is to stamp if from a preform. Stamping allows convolutions 62 to be formed in the backup plate 50 that are otherwise difficult to machine. In particular, nonradially symmetric convolutions may easily be formed. Other convolution forms that may be stamped include helical, ribbed, radial asymmetric, circumferentially asymmetric and various combination forms thereof. In general, the backup plate 50 may be stamped with any convolution 62 form. The backup plate 50 further includes a formed passage 64 opening to the diaphragm cavity 58.

Adjacent the backup plate 50, on the side opposite from the diaphragm 54 is a process shield 66 having a corresponding formed passage 68. Applicants prefer a process gasket 42 and a process shield 66 as a means for sealing the process fluid in the housing cavity 32. The process shield 66 is a highly corrosion resistant barrier to prevent exposure of the housing 30 to the process fluid. In the preferred form, the process shield 66 is an annular disk sealed to the tube 48. The shield 66 conforms to the housing 30 along the cavity wall 72. The housing 30 then bears the fluid pressure placed on the shield 66, thereby allowing the shield 66 to be made thinner and less expensively. The process shield 66 extends radial beyond the limit of the backup plate 50, and the diaphragm 54 to provide a conveniently exposed circumferential seal area 74 where the process gasket 42 contacts the process shield 66. When the housing 30 is joined to the cover plate 36, the process gasket 42 is compressed between the cover plate 36 and the seal area 74, and the seal area 74 is pressed against the housing 30.

The tube 48 in the general form of a shaft, for a length equal to the thickness of the backup plate 50 and process shield 66 has a shaft inlet end 76 with a diameter 78. The backup plate passage 64 and process shield passage 68 form a close fit with the shaft inlet end 76. To match the housing port 44 diameter, the tube 48 diameter increases to a second diameter 80. The increased diameter forms on the length of the tube 48 a weld lip 82. During assembly the process shield 66 and then the backup plate 50 are fit to the inlet tube end 76 and held against the weld lip 82. The backup plate 50 and process shield 66 are then welded 83 to the weld lip 82 sealing the backup plate 50 and process shield 66 to the tube 48.

Farther along the length of the tube 48, the tube diameter narrows forming a seat lip 84. The housing port 44 includes a corresponding narrowed port diameter forming a housing seat 46. The housing port 44 with the housing seat 46 receives the tube 48. The housing seat 46 contacts the seat lip 84 to resist pressure applied in the housing cavity 32. Running through the length of the tube 48, starting at the inlet end 76 is an internal passage 86. The internal passage 86 extends to an outlet end 88 for further attachment as may be conveniently chosen.

In operation, the process fluid enters through the cover plate 36 by way of the process fluid port 38 to wet the cover plate's 36 interior face and the process gasket 42. The cover plate 36 may be surface coated along the wetted interior face with an appropriately chosen material to reduce manufacturing cost. The process gasket 42 material is chosen to meet process requirements. The process fluid also wets the diaphragm unit 34, including the backup plate 50, the diaphragm 54, and the process shield 66. Since the areas wetted by the process fluid are limited to the diaphragm unit 34, cover plate 36 and process gasket 42, the amount of expensive anticorrosive material required is quite small. No part of the housing 30 is normally wetted. The housing 30 may therefore be made of ordinary materials.

Numerous variations on the method of sealing the diaphragm unit 34 to the housing 30 are possible. The diaphragm 54 may be sealed to the housing 30 at any point along the length of the tube 48 and backup plate 58 structure, provided there is no interference with the attachment edge 52. For example, the tube 48 may be threaded to the housing 30, or the process shield 66 may extend to a portion threaded to the housing 30. The process shield 66 may extend to the process fluid port 38. The process shield 66 may be pressed against an O ring, or welded to an interior housing ring threaded or otherwise sealed to the housing. A further alternative is to include a threaded portion along the length of the tube 48. The threaded portion is then threaded to a corresponding portion of the housing 30, or a coacting threaded element sealing the two elements to the housing 30. The seal is to contain and separate the housing cavity 30 and diaphragm cavity 54 fluids.

In each seal form presented, the diaphragm unit 34 is interchangeable in the housing 30. At the time of assembly, a standard housing 30 is combined with a diaphragm unit 34 made of the proper process resistant materials. If the diaphragm unit 34 fails during or after assembly, the diaphragm unit 34 may be removed from the housing 30, and replaced. The housing 30 is then not sacrificed.

Applicants have made floating diaphragm units having a 0.05 mm (0.002 inch) thick diaphragm welded to a stamped backup plate 3.81 cm (1.50 inch) in diameter and 0.762 mm (0.03 inch) thick. The diaphragm is hydraulically formed against the stamped backup plate to create convolutions corresponding exactly to those in the stamped backup plate. The process shield is a disk 0.381 mm (0.015 inch) thick, and 4.559 cm (1.795 inch) in diameter. The tube has a maximum diameter of 6.6 mm (0.260 inch) with an internal passage diameter of 0.711 mm (0.028 inch) and overall length of 1.880 cm (0.740 inch). The backup plate and process shield are electron beam welded to the tube in an appropriate atmosphere. The standard material for all components is a cobalt nickel chrome stainless steel. Components have also been made from AISI type 316L stainless steel, Hastelloy C-276, Monel, and tantalum.

Figure 3:
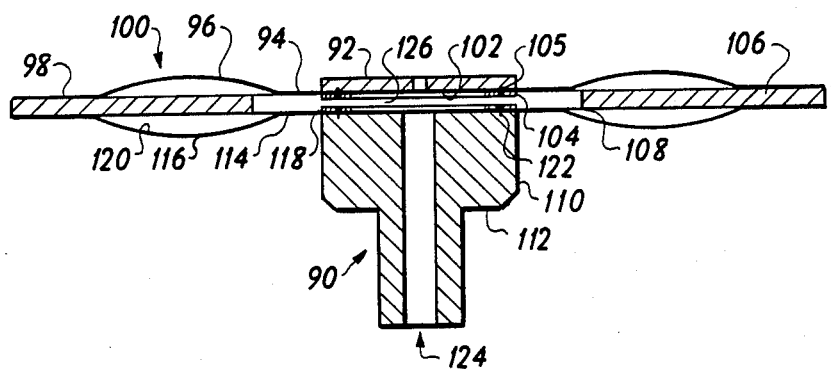
FIG. 3 shows a cross section of a preferred embodiment of a floating sensing diaphragm.

FIG. 3 shows a preferred embodiment of a floating sensing diaphragm unit. A sensing diaphragm unit 90 is exposed to inert fill fluids, and is not exposed to corrosive process fluids. A washer 92 is mounted centrally on an exterior surface 94 of a first flexible diaphragm 96. The first flexible diaphragm 96 is circular with a circumferential attachment edge 98. A single convolution 100 is included bowing in the exterior direction between the radial edge of the washer 92 and the attachment edge 98. The preferred convolution 100 further includes radial ribs (not shown). Mounted on the central portion of an interior surface 102 of the first diaphragm 96 is a first weld ring 104 radially coextensive with the washer 92. During assembly, the washer 92, and the first weld ring 104 are placed about the first diaphragm 96. The three are then welded 105 as a unit.

The interior surface 102 of the first diaphragm 96 is welded at the attachment edge 98 to a spacer 106. The preferred spacer 106 is annular with a smaller inner diameter 108 than the diameter of the attachment edge 98, but somewhat larger that the diameters of the washer 92 and first weld ring 104. The flexible diaphragm 96 for a majority of the convolution 100 portion, then overlaps the spacer 106 which acts as a partial backup plate. The spacer 106 is at least radially rigid to preserve the peripherial location of the diaphragm 96.

A tube 110 having a seating lip 112 is attached centrally to the exterior surface 114 of a second similar flexible diaphragm 116. In a similar fashion a second weld ring 118 radially coextensive with the tube 110 is positioned along the center of an interior surface 120 of the second diaphragm 116. The the tube 110, the second diaphragm 116, and second weld ring 118 are then welded 122 as a group to seal the tube 110 to the second diaphragm 116. Running the length of the tube 110, and passing through the second diaphragm 116, and second weld ring 118 is an internal passage 124.

The interior surface 120 of the second diaphragm 116 is then attached to the spacer 106 on the side opposite the attachment for the first diaphragm 96. The two diaphragms 96, 116 are substantially coextensive, and parallel, forming between the two interior surfaces 102, 120 a diaphragm cavity 126 opening to the internal tube passage 124.

The floating sensing diaphragm unit is seated 112 in an enclosing housing cavity similar to the mounting of a process diaphragm unit. On pressure variation the first 96 and second 116 flexible diaphragms are forced toward or away from each other thereby changing the volume of the diaphragm cavity 126. Unlike a bladder, the area of force application is well defined by the stiffness of the washer 92, weld rings 104, 118, spacer 106 and the tube 110. The fluid of the diaphragm cavity 126 is forced through the internal passage 124 where its pressure is then measured, or otherwise applied.

On further pressurization the interior surfaces 102, 120 of the diaphragms contact the overlap portion of the spacer 106 which could act as a backup plate. Still further pressurization is prevented by overrange mechanisms as known in the art.

Variations in the sensing diaphragm are also possible. The spacer 106 may comprise a ring with a circular or other cross section, or may be an annulus or disk with convolutions, holes or other features to enhance contact and release between the diaphragms and spacer. The spacer 106 may be removed or replaced with a radially flexible spacer to provide a highly flexible sensing diaphragm unit. Again, the preferred form is to have little or no contact between the diaphragms and the housing or enclosing structure through which external or structural forces might disturb the diaphragm response.

Applicants have made a floating sensing diaphragm with a washer 0.48 mm (0.019 inch) thick with an outside diameter of 7.62 mm (0.3 inch) and an inside diameter of 0.53 mm (0.021 inch). The flexible diaphragms are 2.54 cm (1 inch) in diameter and 0.05 mm (0.002 inch) thick. The second flexible diaphragm includes an inside diameter of 5.13 mm (0.202 inch). The spacer 106 has an outside diameter of 2.54 cm (1 inch), an inside diameter of 10.66 mm (0.42 inch) and a thickness of 0.25 mm (0.01 inch). The weld rings are 0.127 mm (0.005 inch) thick with an outside diameter of 7.62 mm (0.3 inch) and an inside diameter of 2.36 mm (0.093 inch). The tube has a maximum outside diameter of 7.62 mm (0.3 inch), seat diameter of 4.05 mm (0.1595 inch) and an internal passage diameter of 1.32 mm (0.052 inch). The seat lip is 4.38 mm (0.1725 inch) from the outlet port. The overall length is 8.11 mm (0.3195 inch).

While there have been shown and described what are at present considered to be the preferred embodiments of the invention, it will be apparent to those skilled in the art that various changes and modifications can be made herein without departing from the scope of the invention definded by the appended claims, for example other means of isolating the attachment edge may be employed. A flexible mounting exterior to the rigid attachment edge is one solution. Convolutions and ribs may be included in the diaphragms. The backup plate or second diaphragm may be concave or convex with respect to the diaphragm cavity.

What is claimed is:

1. A floating diaphragm apparatus comprising:
   (a) a diaphragm having an attachment edge, an inner surface, and an outer surface inside the perimeter of the attachment edge,
   (b) a diaphragm support at least coextensive with the diaphragm having an inner support surface opposite the diaphragm inner surface and coupled at a peripheral region thereof to the diaphragm along the attachment edge, thereby forming a diaphragm cavity between the diaphragm inner surface and inner support surface, said diaphragm support being structurally supported at a central region thereof and said peripheral region being free of structural support whereby said peripheral region and the attachment edge of said diaphragm are substantially isolated from structural force transmission, and
   (c) a substantially incompressible tube including a fluid passage sealingly linked to the diaphragm cavity to conduct fluid to and from the diaphragm cavity.

2. The apparatus of claim 1 wherein the diaphragm support is a rigid backup plate.

3. The apparatus of claim 2 wherein the inner surface of the rigid backup plate includes a concave portion.

4. The apparatus of claim 1 wherein the tube is sealed to the diaphragm support, and the internal tube passage joins the diaphragm cavity through the diaphragm support.

5. The apparatus of claim 4, further including means for sealing the apparatus to a housing.

6. The apparatus of claim 5 wherein the means for sealing the tube to the housing comprises a process shield.

7. Diaphragm apparatus comprising:
   a housing having first and second parts secured together;
   said housing parts being formed to establish a cavity therebetween;
   one of said housing parts being formed with a port to provide for fluid communication with said cavity;
   a diaphragm positioned in said cavity and having an outer attachment edge;
   a rigid diaphragm support member parallel to and adjacent said diaphragm, said outer attachment edge being secured to said support member to form therewith a unitary diaphragm assembly having an outer periphery and an inner central region; and
   means at said central region securing said diaphragm assembly to said housing to provide that said diaphragm receives potentially distorting forces only through said central region, the remainder of said diaphragm assembly being effectively floating with respect to the fluid in said cavity.

8. Apparatus as claimed in claim 7, wherein said diaphragm support member is a back-up plate having convolutions matable with the diaphragm convolutions.

9. Apparatus as claimed in claim 8, wherein said back-up plate is thicker than said diaphragm but sufficiently thin whereby the plate may be inexpensively stamped from a preform.

10. Apparatus as claimed in claim 8, including a process shield generally parallel to said back-up plate and adjacent thereto on the side opposite said diaphragm;
    said process shield being secured to said central region of said diaphragm assembly; and
    means beyond the outer periphery of said diaphragm assembly to seal said process shield to prevent said fluid in said cavity from communication with the side of said process shield opposite said back-up plate.

11. Apparatus as claimed in claim 7, including means in said cavity for sealing the fluid in said cavity.

12. Apparatus as claimed in claim 11, wherein said sealing means comprises gasket means beyond the outer periphery of said diaphragm assembly.

13. Apparatus as claimed in claim 7, wherein said means at said central region comprises a tube secured to said diaphragm assembly and formed with an inner passage to communicate with the region alongside of the adjacent side of said diaphragm.

14. Apparatus as claimed in claim 13, including a process shield parallel to said diaphragm assembly and secured to said tube.

15. Apparatus as claimed in claim 7, including a second diaphragm in said cavity parallel to said first diaphragm and secured at an outer attachment edge to said support member on the side thereof opposite said first diaphragm;
    said two diaphragms and said support member forming a unitary diaphragm assembly.

16. Apparatus as claimed in claim 15, wherein said support member is an annular washer-like spacer having an inner diameter smaller than the diameter of the diaphragm attachment edge.

17. Apparatus as claimed in claim 16, including a support tube secured to one of said diaphragms at the central region of said assembly;
    said tube being formed with an internal passage to effect fluid communication with the region between said diaphragms.

18. A floating diaphragm apparatus comprising:
    (a) a diaphragm having an attachment edge, an inner surface, and an outer surface inside the perimeter of the attachment edge,
    (b) a diaphragm support oomprising a rigid backup plate at least coextensive with the first diaphragm, having an attachment area substantially isolated from structural force transmission and having an inflexible circumference, having an inner support surface opposite the inner diaphragm surface, including a concave portion having convolutions, the diaphragm support being coupled to the diaphragm along the attachment edge, thereby forming a diaphragm cavity between the inner diaphragm surface and inner support surface,
    (c) a process shield for sealing the apparatus to a housing extending beyond a projection of the backup plate onto the housing, and
    (d) a substantially incompressible tube sealed to the backup plate including a fluid passage joining the diaphragm cavity passage through the backup plate to conduct fluid to and from the diaphragm cavity.

19. A floating diaphragm apparatus comprising:
    (a) a first flexible diaphragm having a first inner surface, an attachment edge, and a radially incompressible spacer coupled along the attachment edge,
    (b) a second flexible diaphragm at least coextensive with the first diaphragm, having an attachment edge, a second inner surface, parallel to the first inner surface, and sealed at its attachment edge to the spacer opposite the first diaphragm to form a diaphragm cavity between the first inner surface and second inner surface, said spacer and said diaphragm attachment edges being free of any structural support whereby the attachment edges are substantially isolated from structural force transmission,
(c) means for sealing the apparatus to a housing, and
(d) a tube including an internal passage sealingly linked through the second diaphragm to the diaphragm cavity.

20. A replaceable diaphragm apparatus for use in a housing cavity comprising:
(a) a diaphragm unit comprising:
  (i) a diaphragm support having an exterior portion,
  (ii) a flexible diaphragm sealed along an outer peripheral attachment edge to the diaphragm support to form an enclosed cavity, and
  (iii) a tube including an internal passage sealingly linked to the diaphragm cavity through the diaphragm support, means at a central region of said diaphragm support to provide structural support for said diaphragm support with said diaphragm attached thereto, said diaphragm support being free of structural support at the region of connection to said peripheral attachment edge, and
(b) removable sealing means for sealing between the housing cavity and the diaphragm cavity in an area from between a point adjacent the attachment edge, along the exterior of the diaphragm support to a point along the tube.

21. A diaphragm apparatus having limited process fluid contact, comprising:
(a) a diaphragm unit for use in a housing having a portion including a process fluid port comprising:
  (i) a diaphragm support having an exterior,
  (ii) a flexible diaphragm sealed along an outer peripheral attachment edge to the diaphragm support to form an enclosed diaphragm cavity, and
  (iii) a tube including an internal passage sealingly linked to the diaphragm cavity through the diaphragm support, means at a central region of said diaphragm support to provide structural support for said diaphragm support with said diaphragm attached thereto, said diaphragm support being free of structural support at the region of connection to said peripheral attachment edge, and
(b) sealing means for sealing between the diaphragm unit and the housing portion including the process fluid port in an area from between the exterior of the diaphragm support to a point along the tube.

* * * * *